United States Patent [19]

Du Bae

[11] 4,186,603
[45] Feb. 5, 1980

[54] TURBINE FLOWMETER

[75] Inventor: Hyung Du Bae, Brea, Calif.

[73] Assignee: International Telephone and Telegraph Corporation, New York, N.Y.

[21] Appl. No.: 939,854

[22] Filed: Sep. 5, 1978

[51] Int. Cl.² ............................................. G01F 1/12
[52] U.S. Cl. ............................................... 73/231 R
[58] Field of Search ..................... 73/231 M, 231 R; 415/104, 106

[56] References Cited
U.S. PATENT DOCUMENTS

| 3,238,776 | 3/1966 | Potter | 73/231 R |
| 3,756,079 | 9/1973 | November | 73/231 R |
| 3,999,432 | 12/1976 | Coninx et al. | 73/231 R |

FOREIGN PATENT DOCUMENTS 222684  4/1969  U.S.S.R. .............................. 73/231 R

Primary Examiner—Herbert Goldstein
Attorney, Agent, or Firm—A. Donald Stolzy

[57] ABSTRACT

A turbine flowmeter having a rotor with a hub and conventional blades outside the hub. An impeller is fixed inside the hub to keep an axial pressure on the rotor to maintain it axially slidable but spaced from a diffuser at each end of the hub. Alternative constructions include upstream diffuser passageways and a hub somewhat larger than the upstream diffuser.

2 Claims, 7 Drawing Figures

TURBINE FLOWMETER

BACKGROUND OF THE INVENTION

This invention relates to the art of measuring properties of fluids, and more particularly to a turbine flowmeter with a rotor having little or no thrust bearing friction.

PRIOR ART STATEMENT

A prior art turbine flowmeter having a small or no rotor thrust bearing friction is disclosed in U.S. Pat. No. 3,756,079, issued Sept. 4, 1973. However, this patent does not disclose rotor blades and a self-controlling impeller besides.

SUMMARY OF THE INVENTION

According to the turbinemeter of the present invention, the above-described and other disadvantages of the prior art are overcome by providing a rotor having external blades and self-balancing internal blades.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
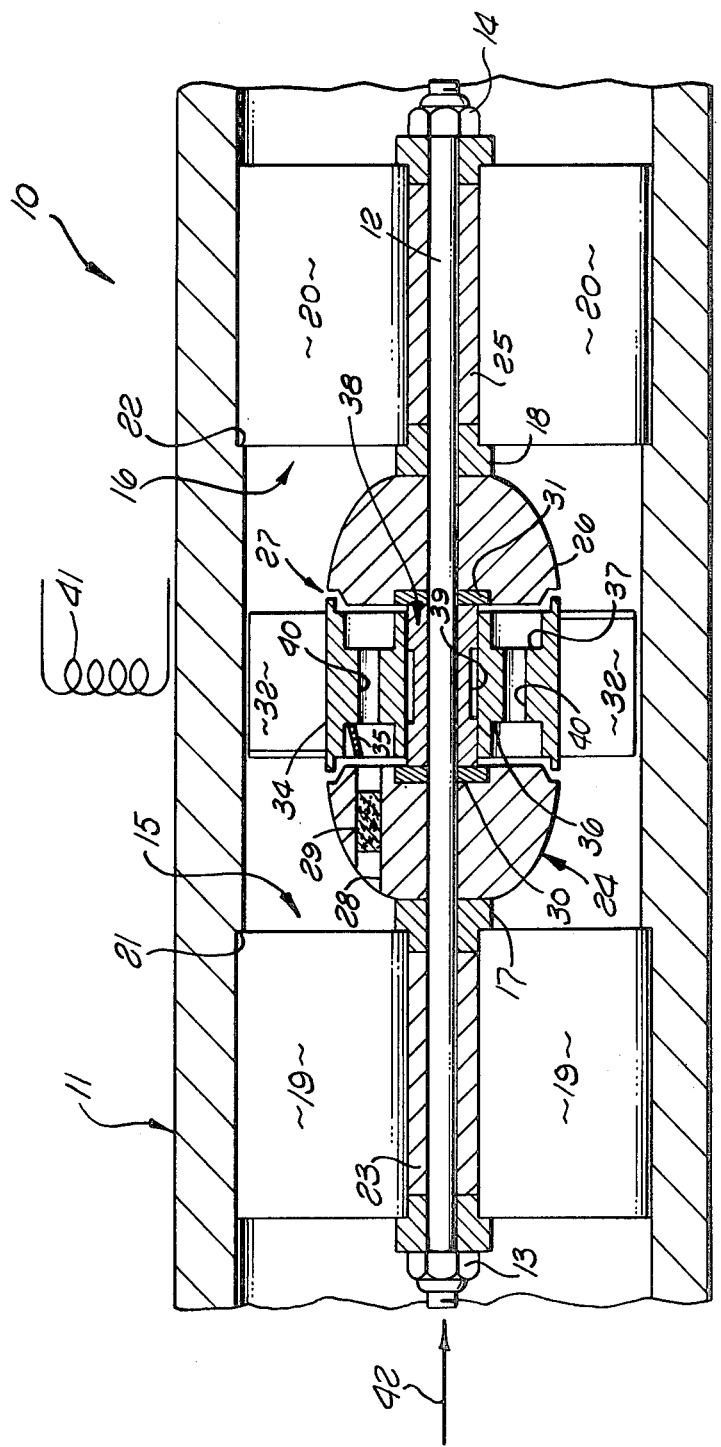
FIG. 1 is a longitudinal sectional view through a turbinemeter constructed in accordance with the present invention.

In FIG. 1, a turbine meter is indicated at 10 having a plastic pipe section 11 with a rod 12 placed in tension by hex head nuts 13 and 14 threaded thereto. Rod 12 is otherwise supported by means 15 and 16 in a fixed axial position in pipe section 11, and in a position, for example, such that the symmetrical axis of rod 12 is the same as the symmetrical central axis of pipe section 11. Means 15 and 16 will be described only briefly because they may be identical to that disclosed in the said patent. Means 15 is defined as including a ferrule 17 and all the structures surrounding rod 12 to the left of ferrule 17, and that portion of rod 12, itself. Similarly, means 16 may be defined as including a ferrule 18 and everything to the right thereof surrounding rod 12 and that portion of rod 12, itself.

Means 15 and 16 are fully disclosed and described in the said patent. However, a brief description thereof is submitted herewith for a better understanding of the present invention.

The left end of rod 12 is supported by four thin hollow cylinders 19 symmetrically spaced about the axis of rod 12. Cylinders 20 are also provided, which may be identical to or similar to cylinders 19, and be four in number and symmetrically spaced.

Small portions of cylinders 19 abut a shoulder 21 inside pipe section 11.

Cylinders 20 have small portions which abut a shoulder 22 of pipe section 11.

In accordance with the foregoing, the tightening of nuts 13 and 14 does not provide substantial compressive stress on the structures between ferrules 17 and 18. However, if desired, ferrule 17 may be fixed to cylinders 19 or a cylinder 23 and to an upstream diffuser 24, if desired.

Similarly, ferrule 18 may be fixed relative to cylinders 20 and/or a cylinder 25 and to a downstream diffuser 26.

Upstream diffuser 24 has an axial hole 28 therethrough in which a filter 29 is fixed. A rotor 27 is provided between diffusers 24 and 26, diffusers 24 and 26 carrying thrust bearings 30 and 31, respectively.

Rotor 27 is constructed so that it does not touch either diffuser 24 or 26, or either thrust bearing 30 or 31.

Figure 2:
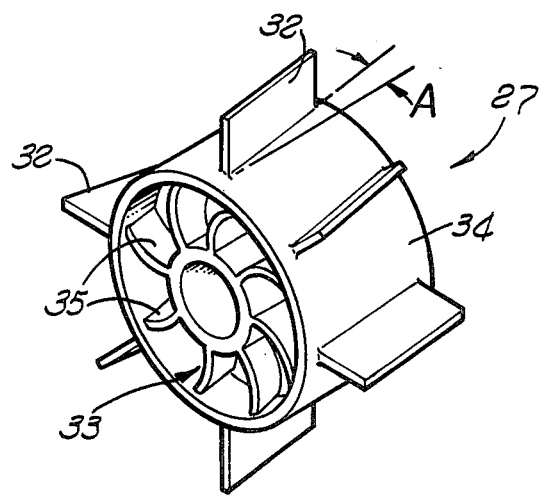
FIG. 2 is a perspective view of a rotor shown in FIG. 1.

Rotor 27 is provided with six blades 32, each having a pitch A shown in FIG. 2.

In FIG. 2, an impeller 33 is made integral with or fixed within a hub 34 of rotor 27.

Impeller 33 has blades 35 which twist like an aircraft propeller and have a moderate pitch as indicated at 35 in FIG. 1. The pitch of blades 35 is not necessarily equal to the pitch A, but is in the same direction. This characteristic of the rotor of the present invention will be described in somewhat greater detail in connection with FIGS. 3, 4 and 5.

Rotor 27 has recesses 36 and 37 shown in FIG. 1. Nothing is provided in recess 37. However, impeller 33 is provided in recess 36.

If desired, all of the structures from nut 13 to nut 14 may be clamped together and/or fixed together by welding or other conventional means.

A spacer cylinder 38 is provided around rod 12 and, for example, clamped between thrust bearings 30 and 31. Cylinder 38 may have an annular groove 39, if desired, for self lubrication or otherwise.

Rotor 27 has eight holes 40 extending axially therethrough between recesses 36 and 37, each hole 40 being provided between each pair of immediately adjacent blades 35.

Pipe section 11 is preferably made of a plastic, non-magnetic and/or non-conductive material and a coil 41 is positioned adjacent blades 32 outside pipe section 11 in which pulses are generated. See the said patent. In this case, blades 32 may be ferromagnetic, and pipe section 11 may be non-magnetic.

It is also conventional in the prior art to use non-magnetic blades 32, and have coil 41 connected in the tank circuit of an oscillator. The oscillator then changes frequency each time a blade 32 passes coil 41. Pipe section 11 is then made of a non-conductive material.

In the first case, the pulses from coil 41 may be counted directly. In the second case, a frequency-to-voltage converter similar or identical to a phase locked loop may be employed to produce output pulses.

In either case, coil 41 or the circuitry connected thereto produces output pulses, the pulse repetition frequency (PRF) of which is proportional to the rate of flow of fluid inside pipe section 11. Further, if the pulses are totaled, the total flow may be stored, recorded, indicated or employed to provide some process control or otherwise.

OPERATION

In the operation of the embodiment of FIG. 1, impeller 33 acts similarly to an "exhaust fan" which pulls the fluid in pipe section 11 from the outside of hub 34 and diffuser 24 into the space between them and through holes 40 and outwardly of the space between hub 34 and diffuser 26. The flow between hub 34 and diffuser 26 prevents rotor 27 from touching diffuser 26 or thrust bearing 31.

Note will be taken that flow is in the direction of an arrow 42 shown in FIG. 1. For this reason, flow against blades 32 will put a downstream drag on rotor 27. However, as stated previously, rotor 27 will be prevented from touching diffuser 26 or thrust bearing 31 because of the flow produced internally of hub 34 by impeller 33 through holes 40 and outwardly between hub 34 and diffuser 26.

If needed, hole 28 may be provided to allow fluid to flow into recess 36 and be acted upon by impeller 33 rather than relying exclusively upon flow between hub 34 and diffuser 24 from the exterior of diffuser 24 to the space between diffuser 24 and rotor 27.

Figure 3:
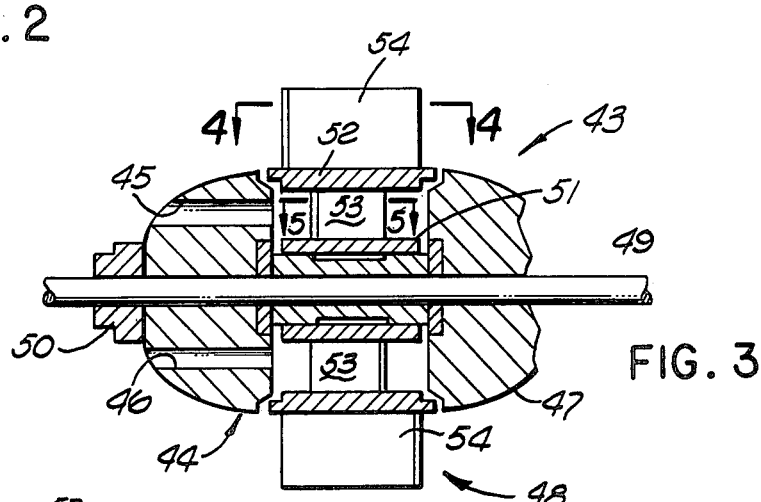
FIG. 3 is a longitudinal sectional view of an alternative embodiment of the present invention.

An alternative embodiment of the present invention is illustrated at 43 in FIG. 3 wherein an upstream diffuser 44 has holes 45 and 46 therethrough similar to hole 28 in FIG. 1. A downstream diffuser is provided at 47. A rotor is provided at 48. Rotor 48 and all the structures shown in FIG. 3 except rod 49 itself are supported on rod 49 as before. The same is true of a ferrule 50.

Rotor 48 is different from rotor 27 because it is provided with an inner hub 51 fixed to an outer hub 52 by impeller blades 53 which may be similar to impeller blades 54. In turn, impeller blades 54 may be similar to or identical to impeller blades 32 shown in FIG. 2.

Figure 4:
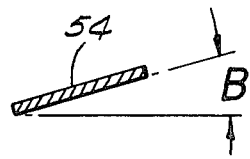
FIG. 4 is a longitudinal sectional view of a turbinemeter rotor blade taken on the line 4—4 shown in FIG. 3.
Figure 5:
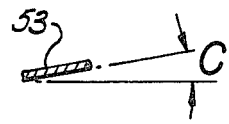
FIG. 5 is a longitudinal sectional view of an impeller blade taken on the line 5—5 shown in FIG. 3.

As shown in FIG. 4, impeller blades 54 may have a pitch B. In FIG. 5, impeller blades 53 may have a pitch C. B may be different than C. The size and shape of blades 54 may be different from the size and shape of blades 53, if desired. Note will be taken that blades 53 are fixed to both outer hub 52 and inner hub 51. Except for the foreoing, the operation of the embodiment of FIG. 3 may be similar to or identical to the operation of turbinemeter 10 shown in FIG. 1.

Figure 6:
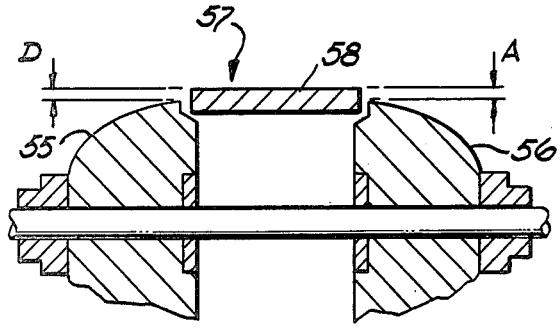
FIG. 6 is a longitudinal sectional view of a second alternative embodiment of the present invention.

A third embodiment of the present invention is illustrated in FIG. 6 including upstream and downstream diffusers 55 and 56, neither of which have any holes therethrough. A rotor is provided at 57 which may be identical to rotor 27 or to rotor 48 shown in FIGS. 1 and 3, respectively, except that hub 58 need not be notched, as before, and that the outer cylindrical surface of hub 58 is spaced a distance D beyond the maximum radius of diffusers 55 and 56.

In the alternative, diffusers 24 and 26 in FIG. 1, diffusers 44 and 47 in FIG. 3, and diffusers 55 and 56 in FIG. 6 may or may not be identical or may be somewhat different.

The embodiment of FIG. 6 employs hub 58 in the position shown therein to place additional drag upon rotor 57 to insure that rotor 57 does not touch diffuser 55.

Figure 7:
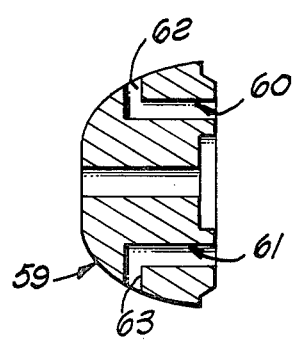
FIG. 7 is a longitudinal sectional view of a third alternative embodiment of the present invention.

Still another embodiment of the present invention may be provided with an upstream diffuser as indicated at 59 in FIG. 7 having holes 60 and 61 therethrough with openings at 62 and 63, respectively. Diffuser 59 thus may or may not be identical to diffuser 44 in FIG. 3 except that radial openings 62 and 63 are provided in communication with holes 60 and 61, respectively, holes 45 and 46 in FIG. 3 being straight through diffuser 44 in an axial direction. Holes 60 and 61 do not extend completely through diffuser 59 in an axial direction to the left, as viewed in FIG. 7.

What is claimed is:

1. A turbine flowmeter comprising: a hollow housing having an approximately cylindrical internal bore, said bore having an axis; a rotor including a hub and a plurality of fan-like rotor blades fixed thereto in a position extending radially outwardly therefrom; support means fixed relative to said housing inside thereof, said rotor being mounted on said support means and being rotatable relative thereto about said axis and axially slidable thereon; flow control means fixed relative to said support means, said flow control means including a diffuser fixed relative to said support means spaced axially from said rotor on each side thereof, each said diffuser having an external surface which is approximately a surface of revolution concentric with said axis, the diameter of each said diffuser external surface increasing in an axial direction toward said rotor, said flow control means being constructed and positioned to prevent fluid flowing axially inside said bore from reaching said rotor except by flowing over the external surface of one of said diffusers toward said rotor, said hub having an approximately cylindrical external surface, said rotor being hollow and having an impeller fixed therein to increase the pressure on the downstream diffuser inside said hub to keep said rotor spaced from said downstream diffuser when said rotor is turned by flow in said bore against said rotor blades, downstream movement of said rotor away from the upstream diffuser decreasing the space between said rotor and said downstream diffuser for restricting escape of fluid therebetween to limit the ability of said impeller to move downstream, movement of said rotor toward the upstream diffuser reducing the space therebetween, reducing flow to said impeller and reducing its ability to move said rotor upstream, said upstream diffuser having a passageway therethrough from the exterior thereof to the interior of said hub upstream of said impeller, said passageway being L-shaped and having one radial leg and one axial leg in communication therewith.

2. A turbine flowmeter comprising: a hollow housing having an approximately cylindrical internal bore, said bore having an axis; a rotor including a hub and a plurality of fan-like rotor blades fixed thereto in a position extending radially outwardly therefrom; support means fixed relative to said housing inside thereof, said rotor being mounted on said support means and being rotatable relative thereto about said axis and axially slidable thereon; flow control means fixed relative to said support means, said flow control means including a diffuser fixed relative to said support means spaced axially from said rotor on each side thereof, each said diffuser having an external surface which is approximately a surface of revolution concentric with said axis, the diameter of each said diffuser external surface increasing in an axial direction toward said rotor, said flow control means being constructed and positioned to prevent fluid flowing axially inside said bore from reaching said rotor except by flowing over the external surface of one of said diffusers toward said rotor, said hub having an approximately cylindrical external surface, said rotor being hollow and having an impeller fixed therein to increase the pressure on the downstream diffuser inside said hub to keep said rotor spaced from said downstream diffuser when said rotor is turned by flow in said bore against said rotor blades, downstream movement of said rotor away from the upstream diffuser decreasing the space between said rotor and said downstream diffuser for restricting escape of fluid therebetween to limit the ability of said impeller to move downstream, said upstream diffuser having a passageway therethrough from the exterior thereof to the interior of said hub upstream of said impeller, said passageway being L-shaped and having one radial leg and one axial leg in communication therewith.

* * * * *